Patented May 18, 1948

2,441,933

UNITED STATES PATENT OFFICE 2,441,933

SUBSTITUTED IMIDAZOLONES AND PROCESS OF MAKING THEM

Robert Duschinsky, Essex Fells, N. J., assignor to Hoffmann-La Roche, Inc., Nutley, N. J., a corporation of New Jersey No Drawing. Application July 30, 1945, Serial No. 607,915

15 Claims. (Cl. 260—309)

My invention relates to the synthesis of imidazolone compounds of the general formula (A)

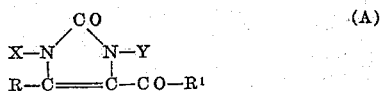

wherein X and Y represent hydrogen, alkyl, substituted alkyl, acyl, or substituted acyl, R represents hydrogen, alkyl, or substituted alkyl, and $CO-R^1$ is a member of the group consisting of acyl and substituted acyl radicals.

Members of the general class illustrated above possess utility in the manufacture of substances having physiological activity. For example, certain members of this class are particularly useful in the preparation of desthiobiotin and related compounds disclosed and claimed in my copending application Serial No. 533,396, filed April 29, 1944, now U. S. Patent No. 2,397,250 of which the instant application is a continuation-in-part.

An important object of the invention resides in the provision of a novel and effective method of producing the chemical compounds with which the present invention is concerned.

Yet another object of the invention is to prepare compounds useful as intermediates in the synthesis of other organic compounds.

Other objects will become apparent in the light of the following description of my invention.

The novel imidazolones of the general formula (A), in which X and Y are hydrogen, may be derived, in general, from imidazolones which are represented by the general formula (B)

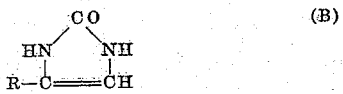

wherein R has the above significance, by means of a Friedel-Crafts condensation with a compound having the general formula

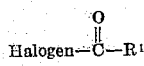

wherein

is a member selected from the group consisting of acyl and substituted acyl radicals.

Compounds (B) may be prepared, for example, by treating imidazolone esters of the formula

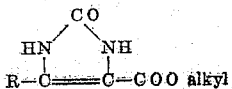

with a saponifying agent, as will be shown in more detail hereinafter.

The new imidazolones of the general formula (A), in which X and Y are hydrogen, may be treated according to methods hereinafter disclosed, to replace the hydrogen atoms in the 1 and 3 positions by other organic radicals, thereby producing compounds in which X and Y represent organic radicals, rather than hydrogen.

The scheme of reaction is represented as follows:

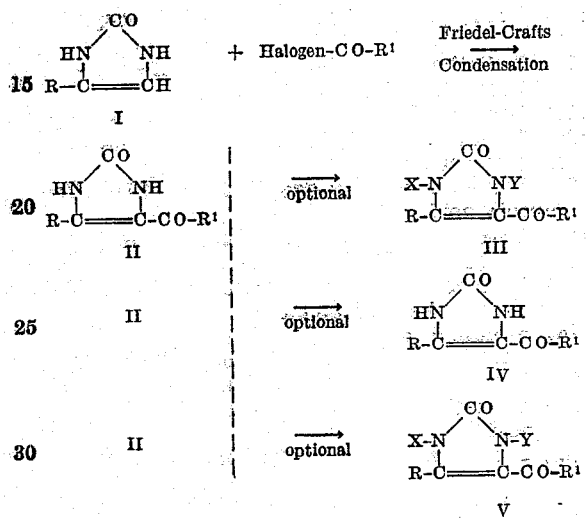

According to this scheme of reaction it will be apparent that compound I is converted into compound II by the Friedel-Crafts condensation. Compound II, which has hydrogen in the 1,3 positions, may then be converted optionally into three classes of compounds:

III—wherein organic substituents replace the hydrogen in the 1 and/or 3 position.

IV—wherein the groups R and/or $R^1$ in the II compound are altered, without replacing the hydrogen atoms in the 1 and/or 3 position.

V—wherein one or more of the hydrogen atoms in the 1,3 positions, and one or more of R, $R^1$, are replaced.

The introduction of a side chain in the 5-position by a Friedel-Crafts condensation to form compound II is a reaction without precedent. It is significant that in a reported investigation on Friedel-Crafts condensations with heterocyclic compounds, E. Ochiai, J. Pharm. Soc., Japan, 60, 164 (German Abstract p. 55) (1940); C. A., 34, 5450 (1940), the statement appears that 4-methylimidazole and 2-phenyl-4-methyl-imidazole failed to react with acyl halides.

Specific examples of compounds which are embraced by my invention are:

(1) 5-imidazolone-(2)-γ-keto-butyric acid methyl ester.
(2) 5-benzoyl-imidazolone-2.
(3) 5-(β-naphthoyl)-imidazolone-2.
(4) 5-(m,p-dihydroxybenzoyl)-imidazolone-2.
(5) 5-(α-bromopropionyl)-imidazolone-2.
(6) 5-(amino-acetyl)-imidazolone-2.
(7) 1,3-diacetyl-5-benzoyl-imidazolone-2.
(8) 1,3-diacetyl-5-(m,p-dimethylbenzoyl-imidazolone-2.
(9) 1,3-diacetyl-4-bromomethyl-5-imidazolone-(2)-δ-bromo-ε-keto-caproic acid ethyl ester.
(10) 1,3-diacetyl-4-thiouronium-methyl-5-imidazolone-(2)-ε-keto-caproic acid ethyl ester bromide.
(11) 4-isopropyl-5-imidazolone-2-γ-keto-butyric acid.
(12) 1,3-(p-toluenesulfonyl)-4-methyl-5-imidazolone-(2)-ε-keto-caproic acid methyl ester.
(13) 1,3-dipropionyl-4-allyl-5-imidazolone-(2)-ε-keto-caproic acid methyl ester.
(14) 4-methyl-5-imidazolone-(2)-γ-methyl-δ-keto-valeric acid.
(15) 1,3-diacetyl-4-benzyloxymethyl-5-imidazolone-(2)-ε-keto-caproic acid methyl ester.
(16) 4-methyl-5-ω-hydroxy-caproyl-imidazolone-2.
(17) 4-methyl-5-imidazolone-(2)-ε-keto-caproic acid.
(18) 4-diethoxymethyl-5-imidazolone-(2)-ε-keto-caproic acid.
(19) 4-methyl-5-cyano-acetyl-imidazolone-2.
(20) 1,4-dimethyl-5-imidazolone-(2)-ε-keto-caproic acid.
(21) 1,3,4-trimethyl-5-imidazolone-(2)-ε-keto-caproic acid.
(22) 1,3-dibenzyl-4-methyl-5-imidazolone-(2-ε-keto-caproic acid.
(23) 1,3-diacetyl-4-benzyloxymethyl-5-imidazolone-(2)-ε-keto-caproic acid.
(24) 4-methyl-5-(Δ⁵-heptenoyl)-imidazolone-2.
(25) 4-methyl-5-cinnamoyl-imidazolone-2.
(26) 4-methyl-5-nicotinoyl-imidazolone-2.
(27) 4-methyl-5-(p-nitrobenzoyl)-imidazolone-2.
(28) 4-methyl-5-(p-aminobenzoyl)-imidazolone-2.
(29) 5,5-adipyl-bis-[4-methyl-imidazolone-2].
(30) 4-ethylxanthogenyl-methyl-5-imidazolone-(2)-ε-keto-caproic acid ethyl ester.
(31) 4-methyl-5-(p-benzamido-benzoyl)-imidazolone-2.
(32) 1,3-diacetyl-4-methyl-imidazolone-2.
(33) 4-methyl-5-imidazolone-(2)-ε-keto-caproic acid ethyl ester.
(34) 1,3-diacetyl-4-methyl-5-imidazolone-(2)-ε-keto-caproic acid ethyl ester.
(35) 4-methyl-5-acetyl-imidazolone-2.
(36) 4-methyl-5-imidazolone-(2)-γ-keto-butyric acid methyl ester.
(37) 1,3-diacetyl-4-methyl-5-acetyl-imidazolone-2.
(38) 4-methyl-5-imidazolone-(2)-γ-keto-butyric acid.
(39) 5-imidazolone-(2)-ε-keto-caproic acid.
(40) 1,3-diacetyl-4-methyl-5-benzoyl-imidazolone-(2).
(41) 4-methyl-5-methylaminoacetyl-imidazolone-(2) hydrochloride.
(42) 1 or 3-monobenzoyl-4-methyl-5-imidazolone-(2)-γ-keto-caproic acid ethyl ester.
(43) 4-methyl-5-imidazolone-(2)-θ-keto-pelargonic acid ethyl ester.
(44) 4-methyl-5-imidazolone-(2)-ε-keto-(α or δ) bromo-caproic acid ethyl ester.
(45) 1,3-diacetyl-4-methyl-5-imidazolone-(2)-ε-keto-(α or δ) bromo-caproic acid ethyl ester.
(46) 4-ethyl-5-imidazolone-(2)-ε-keto-caproic acid ethyl ester.
(47) 4,4-thio-dimethylene-bis-[5-imidazolone-(2)-ε-keto-caproic acid].
(48) 4-methyl-5-imidazolone-(2)-glyoxylic acid.
(49) 4-hydroxymethyl-5-imidazolone-(2)-ε-keto-caproic acid.
(50) 1,3-diacetyl-4-acetoxymethyl-5-imidazolone-(2)-ε-keto-caproic acid ethyl ester.
(51) 1,3-diacetyl-4-bromoethyl-5-imidazolone-(2)-ε-keto-caproic acid ethyl ester.

It will, of course, be understood that while the compounds listed above are individual, pure compounds, it is contemplated that such may, if desired, be prepared and effectively employed in the form of impure reaction mixtures. It will also be appreciated that mixtures of two or more of said compounds, in the pure or impure state, can also be utilized.

As pointed out above, compounds of the general formula (B), such as 4-methyl-imidazolone-2, may be prepared by treating the corresponding carboxylic acid alkyl ester with a saponifying agent. A typical example of such a procedure is given as follows:

EXAMPLE A

*4-methyl-imidazolone-2*

34 grams 4-methyl-5-imidazolone-(2)-carboxylic acid ethyl ester were dissolved in 215 cc. of 0.93 N sodium hydroxide (1 mol) and the solution kept 68 hours at 50°–55°. After cooling it was neutralized to pH 7 by gradual addition of 37.5 cc. of 5 N hydrochloric acid, which was accompanied by much carbon dioxide evolution and crystallization of the reaction product. The mixture was stirred in an ice bath for 1 hour, the methyl-imidazolone filtered off and washed chlorine-free with some ice cold water. After drying in an oven at 60°, a first crop of 6.6 g. was obtained. M. P. 184°–192° C.

The mother-liquor was concentrated in vacuo, while the pH, which had the tendency to increase, was adjusted to 7 by gradual addition of 7 cc. N hydrochloric acid, and was finally brought to dryness. The white residue was extracted 3 times with 35 cc. of boiling absolute ethanol, and once with 95% ethanol. The alcoholic extracts, after separation from the undissolved sodium chloride, were concentrated to dryness, thus yielding a second crop of 8.55 g. methyl-imidazolone melting at ca. 178° C.

The total yield was 15.15 g. The crude material was directly used for the next step.

Sometimes the first crop of reaction product did not crystallize directly, but only after partial concentration of the solution in vacuo.

To obtain a pure sample, the substance was twice recrystallized from 2 volumes boiling water. M. P. 202.5–204.5° C. (after softening at 190° C.). For the analysis it was sublimed at 1 mm. (200° C. bath).

The substance is soluble in water, methanol, ethanol, acetone, also in hot dioxane, ethylacetate and nitrobenzene; insoluble in benzene, chloroform, ether and petroleum ether.

The aqueous or alcoholic solution reduces ammoniacal silver nitrate and gives with ferric chloride solution a deep purple coloration.

Imidazolone-(2), which can be prepared by the method of Marckwald, Ber., 25, 2357 (1892), is also useful as one of the starting compounds (B).

The full significance of the invention will be made apparent by the following examples, which are illustrative of the manner of producing some of the compounds contemplated herein, and which will serve as a guide for those skilled in the art to produce other similar compounds.

EXAMPLE I

*4-methyl-5-imidazolone-(2)-ε-keto-caproic acid ethyl ester*

5.46 g. 4-methyl-imidazolone-2 (Example A) were suspended in 50 cc. nitrobenzene. 11.1 g. (1.04 mol) of adipic acid mono-ethyl ester chloride were added, and the mixture stirred well in a three-neck flask fitted with an airtight mechanical stirrer and ascending condenser. With cooling in an ice bath, 15 g. (2 mols) anhydrous aluminum chloride were added, which readily went into solution, accompanied by heat evolution. Then, with continuous stirring, the temperature was raised to 60°–65° C. and maintained there for five hours. At that time, the evolution of hydrochloric acid had completely stopped.

The reaction mixture was a brown, viscous liquid. It was treated with 50 g. crushed ice and 100 cc. ether, whereupon yellowish crystals separated which were washed chlorine and nitrobenzene free with water and ether. After drying at 100° in vacuo, 7.67 g. of the reaction product were obtained. The yield was 54.0% of the theoretical. M. P. 170° C. By recrystallization in 75 cc. of 50% ethanol, with addition of activated carbon, 6.73 g. (47.5%) of crystals, M. P. 171.5°–173° C., were obtained.

The substance is soluble in alcohol and acetic acid, insoluble in water and ether. It gives only a very slight orange coloration with ferric chloride.

The free acid is obtained from this ester by refluxing with a slight excess of normal sodium hydroxide and acidifying with hydrochloric acid. White crystals melting from 210°–212° C. were obtained.

EXAMPLE II

*4-methyl-5-acetyl-imidazolone-2*

1.96 g. 4-methyl-imidazolone-2 (Ex. A) was reacted with 1.35 g. acetylbromide (1 mol) and 5.4 g. aluminum chloride (2 mol) in 20 cc. nitrobenzene. The temperature of the reaction was 60°, and the time of reaction 5 hours. The reaction mixture was treated with ca. 50 g. ice, the nitrobenzene was eliminated by steam distillation, and the residual solution (75 cc.) was decolorized by boiling with charcoal.

On cooling, 1.39 g. (49.5% of the theory) crystals separated. M. P. 293°–296° (dec.). The crude material was recrystallized from 70 cc. water. The yield was 0.9 g.; M. P. 321° (dec.). For the analysis, 150 mg. were recrystallized a second time from 10 cc. water, and 130 mg. slightly yellowish crystals, melting at 322° (dec.), were obtained.

The substance is soluble in hot water and ethanol, strong acids, and alkali. It is almost insoluble in cold water and organic solvents. The alcoholic solution gives with ferric chloride a yellow coloration. Refluxing with 2 N sodium hydroxide for one hour did not affect the substance. Refluxing two hours with 20% hydrochloric acid gave a 70% recovery, but since the mother-liquor gave a strong red ferric chloride reaction, some cleavage must have taken place. The substance gave an oxime decomposing at about 297° C.

EXAMPLE III

*5-imidiazolone-(2)-ε-keto-caproic acid ethyl ester*

A suspension of 1.68 g. crude imidazolone-2 in 20 cc. nitrobenzene was reacted with 3.84 g. ω-carbethoxy valeryl chloride and 8 g. aluminum chloride at 60°–64° for 4½ hours. The reaction mixture, when treated with 50 g. ice and 100 cc. ether, gave a pasty precipitate, which was purified by dissolving in 20 cc. hot dioxane and precipitating with 60 cc. ether. The yield was 1.22 g. (25%) of crude 5-imidazolone-(2)-ε-keto-caproic acid ethyl ester, which after recrystallization melted at 218°.

EXAMPLE IV

*5-imidazolone-(2)-ε-keto-caproic acid*

800 mg. of the ester of Example III were converted into the acid by heating at 60° for 45 minutes with 12 cc. 0.5 N sodium hydroxide and reacidifying with 6 cc. N hydrochloric acid. The yield was 465 mg.; M. P. 225°. After recrystallization from 25 volumes of water the product melted at 229°.

EXAMPLE V

*4-methyl-5-imidazolone-(2)-θ-keto-pelargonic acid ethyl ester*

A mixture of 3.8 g. 4-methyl-imidazolone-2 and 9.1 g. ω-carbethoxy-octoyl chloride was heated in 40 cc. nitrobenzene with 15.6 g. aluminum chloride at 60°–65° for 4½ hours. The reaction mixture was treated with 100 g. ice and 100 cc. ether, and the waxy crude material thus obtained was filtered off, and recrystallized from 90 cc. 50% alcohol. The yield was 3.98 g.; M. P. 166°–168°. By concentrating the mother-liquor, a second crop of 830 mg., melting at 154°–160°, was obtained. Further recrystallization from 50% alcohol yielded white crystals melting at 168°–169°. The keto ester is soluble in alcohol and acetic acid; insoluble in water, ether and acetone.

EXAMPLE VI

*4-ethyl-5-imidazolone-(2)-ε-keto-caproic acid ethyl ester*

A mixture of 1.62 g. 4-ethyl-imidazolone-2, 20 cc. nitrobenzene, 2.77 g. ω-carbethoxy-valeryl chloride, and 5.75 g. aluminum chloride was reacted 4 hours at 60°–65°. The reaction mixture, when poured on 20 g. ice and 50 cc. ether, deposited crystals which were washed with water and ether. The yield was 1.32 g. M. P. 105°–107°, and after recrystallization from 20 cc. 15% alcohol 108°–109°. The ester is very soluble in ethanol and dioxane; insoluble in water and ether.

EXAMPLE VII

*4-methyl-5-imidazolone-(2)-γ-keto-butyric acid methyl ester*

4.9 g. 4-methyl-imidazolone-2 and 8.3 g. succinic acid mono-methyl ester chloride were suspended in 50 cc. nitrobenzene and reacted with 13.3 g. aluminum chloride at 60°–65°. After 3 hours and 5 minutes, the hydrochloric acid gas evolution stopped. The brown reaction mixture was treated with 50 g. ice and 100 cc. ether, whereupon crystallization occurred. The substance was filtered, washed with water, ether and ca. 20 cc. alcohol. The yield was 4.19; M. P. 195°–197°.

Recrystallization from a mixture of 125 cc. water and 15 cc. ethanol in the presence of activated carbon yielded 2.49 g., melting at 211.5°–213.5°.

A second recrystallization raised the melting point to 214.5°–215.5°.

EXAMPLE VIII

*4-methyl-5-imidazolone-(2)-glyoxylic acid*

9.8 g. 4-methyl-imidazolone-2 and 14.65 g. ethyl-oxalo chloride were reacted in 75 cc. nitrobenzene with 26.6 g. aluminum chloride. Immediate violent gas evolution took place. After 3½ hours, ca. 85% of the theoretical amount of hydrochloric acid has been evolved. The almost solid brown reaction mixture was treated with 100 cc. ether and 100 g. ice. Crystallization occurred and the resulting crystals were filtered and washed with water and ether. The yield was 4.04 g. of greenish-yellow crystals, melting at 240°–250° (dec.).

The crude product was recrystallized from 180 cc. of a mixture of equal volumes of alcohol and water with activated carbon, yielding 2.04 g. of a product decomposing at ca. 245°.

A further recrystallization from 50% alcohol gave yellow crystals decomposing around 260°. This product is the free acid.

EXAMPLE IX

*4-methyl-5-chloro-acetyl-imidazolone-2*

4.9 g. methyl-imidazolone-2 and 6.2 g. chloroacetylchloride were reacted in 50 cc. nitrobenzene with 13.3 g. aluminum chloride. Temperature 60°–65°. After 6 hours, 112% of the theoretical amount of hydrogen chloride were evolved. The mixture was treated with 50 g. ice and 100 cc. ether. The separated crystals were washed consecutively with water, alcohol and ether. The yield was 4.31 g.; M. P. 246°–250° (dec.).

Recrystallization from 600 cc. water in the presence of charcoal gave 3.17 g. decomposing at 248°–250°.

EXAMPLE X

*4-methyl-5-benzoyl-imidazolone-2*

9.8 g. 4-methyl-imidazolone-2 and 15 g. benzoylchloride were reacted in 75 cc. nitrobenzene with 26.6 aluminum chloride. The temperature was maintained at 60°–65° for 5½ hours. The reaction mixture was then treated with 100 cc. ether and 100 g. ice. Pinkish-brown crystals were obtained, which were washed with 50 cc. water and 50 cc. ether.

The crude product was recrystallized from 320 cc. boiling 50% ethanol, giving 13 g. of white, fluffy crystals melting at 255.5°–258°.

EXAMPLE XI

*Diacetyl-4-methyl-5-imidazolone-(2)-ε-keto-caproic acid ethyl ester*

3.75 g. of keto ester obtained in Example I were refluxed 20 minutes with 15 cc. acetic anhydride. The solution was concentrated in vacuo, the residue again refluxed with 15 cc. acetic anhydride and reconcentrated. The residue was then taken up in cold ethanol, whereupon crystals separated which were filtered off and washed with ethanol. The yield was 4.03 g.; M. P. 68°–70°. The substance was recrystallized from ethanol and sublimed at 0.7 mm. and 160° bath temperature. White crystals were obtained, melting at 72.5°–74°; soluble in ether, benzene, and hot ethanol; insoluble in water.

EXAMPLE XII

*Oxime of 4-methyl-5-imidazolone-(2)-ε-keto-caproic acid*

To a solution of 113 mg. of 4-methyl-5-imidazolone-(2)-ε-keto-caproic acid in 2 cc. 0.5 N sodium hydroxide was added a solution of 69.5 mg. hydroxylamine hydrochloride in 1 cc. water. The mixture, having a pH of 6, was concentrated to dryness on a water bath. The residue was taken up with some water and acidified with 2 drops of hydrochloric acid, in order to bring the pH to 5.7. The separated crystals were washed with water and then with alcohol. The yield was 60 mg.

The oxime was recrystallized from 10 cc. water with the addition of some alcohol. M. P. 224°–226° (dec.).

The oxime is insoluble in water and alcohol, and soluble in alkali. It can be reprecipitated from the alkaline solution by acid.

EXAMPLE XIII

*Oxime of 4-methyl-5-acetyl-imidazolone-2*

To a solution of 140 mg. of 4-methyl-5-acetyl-imidazolone-2 in 10 cc. of boiling water, were added 140 mg. of hydroxylamine hydrochloride and 272 mg. of sodium acetate, and the mixture was refluxed for one hour. Crystals separated during the heating. They were filtered off after cooling the reaction mixture, and were washed chlorine-free. The yield was 100 mg. M. P. 297° (dec.). From the concentrated mother-liquor, another 50 mg. were recovered.

EXAMPLE XIV

*Diacetyl-4-methyl-5-imidazolone-(2)-ε-keto-caproic acid ethyl ester*

A solution of 50.8 g. 4-methyl-5-imidazolone-(2)-ε-keto-caproic acid ethyl ester in 200 cc. acetic anhydride was refluxed for 20 minutes. Most of the anhydride was then distilled off at atmospheric pressure. The residue was again refluxed with acetic anhydride, the solution was evaporated at atmospheric pressure and finally in vacuo. The solution of the brownish residual oil in 100 cc. ethanol deposited upon cooling the crystallized diacetyl derivative, which was filtered off and washed with cold ethanol. The yield was 56 g. M. P. 69.5°–70.5°. The alcoholic mother-liquor gave, upon concentration and refluxing the residue again with 25 cc. of acetic anhydride, a second crop of the diacetyl-keto-ester, which was distilled at 0.6 mm. and 165° (bath temperature). It weighed 1.5 g.

EXAMPLE XV

*Diacetyl-4-bromomethyl-5-imidazolone-(2)-ε-keto-caproic acid ethyl ester*

A solution of 165 cc. of carbon tetrachloride, of 50.7 g. diacetyl-4-methyl-5-imidazolone-(2)-ε-keto-caproic acid ethyl ester, was refluxed with 26.5 g. N-bromosuccinimide, until a sample of the mixture applied on moistened iodine starch paper gave no iodine coloration. As a rule the reaction was completed after 40 to 60 minutes. The cooled solution, filtered from the succinimide, gave upon evaporation in vacuo a crystalline mass, which was melted by warming on a water bath and poured into 150 cc. ether. Matted needles separated, which were washed with about 100 cc. ether. The yield was 56 g. M. P. 75°–76.5°. The product is quite soluble in benzene, dioxane, ethyl acetate, and acetic acid; less in ether and alcohol; insoluble in petroleum ether. It can be recrystallized from alcohol.

EXAMPLE XVI

*Diacetyl-4-ethoxymethyl-5-imidazolone-(2)-ε-keto-caproic acid ethyl ester*

To a solution of 2.09 g. of the ester described in Example XV in 150 cc. of ethanol, heated to 45° C., was added a suspension of 0.835 g. silver acetate in 150 cc. of ethanol. After heating the mixture, with continuous stirring, at 50° C. for 10 minutes, the silver bromide was filtered off, and the colorless solution, which contained neither silver nor bromine, was evaporated to a sirup. Distillation at 0.7 mm. and 185° (bath temperature) resulted in considerable decomposition, so that only 550 mg. of distillate were obtained. Colorless oil; $n_D^{23}=1.492$.

EXAMPLE XVII

*4-ethoxymethyl-5-imidazolone-(2) ε-keto-caproic acid and its ethyl ester*

These two compounds can be obtained by boiling the diacetyl-bromo-ester described in Example XV in aqueous alcohol. The boiling serves to remove the acetyl groups and to exchange the bromide atom by an ethoxy group. The reaction mixture is treated with silver acetate to remove the bromine ions present. The mixture is then filtered, and the filtrate is cooled, depositing a mixture of 4-ethoxymethyl-5-imidazolone-(2)-ε-keto-caproic acid and its ethyl ester. This mixture was treated with acetone, which has a greater solubility for the ester, and the free acid, thus obtained, was recrystallized from aqueous alcohol. It melted in an evacuated capillary at 214°–217°. It gives a red ferric chloride reaction.

The acetone soluble fraction gave, upon concentration, waxy crystals. These were recrystallized from ether and alcohol, and finally sublimed at 0.4 mm. and 190°–200° (batch). The product thus obtained is the ethyl ester of 4-ethoxymethyl-5-imidazolone-(2)-ε-keto-caproic acid, melting at 100°–101°.

EXAMPLE XVIII

*Diacetyl-4-acetoxymethyl-5-imidazolone-(2)-ε-keto-caproic acid ethyl ester*

To a solution of 4.42 g. of diacetyl-bromomethyl keto ester described in Example XV, in 50 cc. glacial acetic acid, were added 1.77 g. silver acetate, with stirring and heating to 55°, until the solution contained neither silver nor bromine ions. After separation from the silver bromide, the solution was evaporated and the almost colorless residue dried in vacuo at 100°. The yield was 3.5 to 3.8 g.; $n_D^{24}=1.4507$.

EXAMPLE XIX

*4,4'-thio-dimethylene-bis-[5-imidazolone-(2)-ε-keto-caproic acid]*

A solution of 416 mg. of diacetyl-4-bromomethyl-5-imidazolone-(2)-ε-keto-caproic acid ethyl ester and of 76 mg. thiourea in 2 cc. ethanol was refluxed for 1½ hours. After addition of 5 cc. 1 N sodium hydroxide, the solution was allowed to stand 15 hours at 50°, then boiled for 1 minute, and acidified with 5 cc. 1 N hydrochloric acid. Upon standing on a water bath, yellowish crystals separated which were filtered off, and washed consecutively with water, alcohol, and ether. The yield was 140 mg. The substance was recrystallized from 800 volumes of water. It melted at 252°–253° (dec.). It was easily soluble in alkali, also in pyridine; but hardly soluble in other solvents.

EXAMPLE XX

*4-methyl-5-imidazolone-(2)-ε-keto-caproic acid*

A solution of 122 mg. of the foregoing sulfur compound, Ex. XIX, in 5.5 cc. 0.1 N sodium hydroxide was shaken for 1 hour in a hydrogen atmosphere in the presence of 1 g. prehydrogenated Raney nickel catalyst. The colorless filtrate gave upon acidification with hydrochloric acid 85 mg. of crystals melting at 213.5°–215°.

EXAMPLE XXI

*4-methyl-5-benzoyl-imidazolone-2*

9.8 g. of 4-methyl-imidazolone-2 and 14.05 g. of benzoyl chloride were dissolved in 75 cc. of distilled nitrobenzene. To the stirred and cooled solution were added in three portions 52.1 g. of anhydrous stannic chloride. The temperature of the reaction mixture was then gradually raised to between 60° and 65° C. Hydrogen chloride was evolved. After 3¼ hours the above reaction mixture was poured on 100 g. crushed ice. Then 100 cc. of ether were added, and the mixture kept overnight at 0° C. A precipitate formed, which was filtered off, and was washed on the filter with water and ether. The crude 4-methyl-5-benzoyl-imidazolone-2 thus isolated was recrystallized from aqueous alcohol. The yield was 8.03 g. of the pure compound. M. P. 255°–257° C.

It will be appreciated that the proportions of reactants, times of reaction, temperatures of reaction, and the like, may be varied and that supplementary processes, such as purification and the like, may be resorted to wherever found desirable or convenient. These and other variations and modifications will be evident to those skilled in the art in the light of the guiding principles disclosed herein.

Wherever the formula nucleus

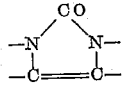

or the term "imidazolone" is employed in the claims, it will be understood to cover the tautomeric forms.

What I claim is:

1. Compounds of the general formula

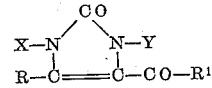

wherein X and Y each is a member of the group consisting of hydrogen, alkyl, aralkyl and acyl radicals, R is a member of the group consisting of hydrogen and aliphatic radicals, and CO—R¹ is an acyl radical.

2. Compounds of the general formula

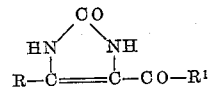

where R is a member of the group consisting of hydrogen and aliphatic radicals, and CO—R¹ is an acyl radical.

3. Compounds of the general formula

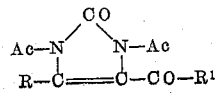

wherein Ac means acyl, R is a member of the group consisting of hydrogen and aliphatic radicals, and CO—R¹ is an acyl radical.

4. Compounds of the general formula

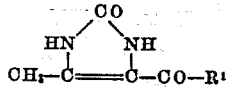

wherein CO—R¹ is an acyl radical.

5. Compounds of the general formula

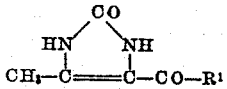

wherein CO—R¹ is a carbalkoxy acyl radical.

6. Compounds of the general formula

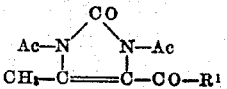

wherein Ac is acyl, and CO—R¹ is a carbalkoxy acyl radical.

7. Compounds of the general formula

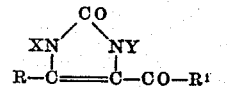

wherein X and Y each is a member of the group consisting of hydrogen, alkyl, aralkyl, and acyl radicals, R is a member of the group consisting of hydrogen and aliphatic radicals, and CO—R¹ is a carbalkoxy acyl radical.

8. Compounds of the general formula

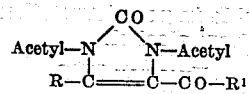

wherein R is a member of the group consisting of hydrogen and aliphatic radicals, and CO—R¹ is an acyl radical.

9. 4-methyl-5-imidazolone-(2)-ε-keto caproic acid ethyl ester.

10. Diacetyl - 4 - methyl - 5 - imidazolone - (2) - ε-keto-caproic acid ethyl ester.

11. Diacetyl - 4 - acetoxy - methyl - 5 - imidazolone-(2)-ε-keto-caproic acid ethyl ester.

12. A process which comprises reacting a member of the group consisting of imidazolone-2 and a 4-alkyl-imidazolone-2 compound with a carboxylic acyl halide in the presence of a Friedel-Crafts catalyst to form the corresponding 5-acyl-imidazolone-2 compound.

13. The process of claim 12 in which the 5-acyl-imidazolone-2 compound is acylated to form a 1,3-diacyl-5-acyl-imidazolone-2.

14. The process of claim 12 in which a 4-alkyl-imidazolone-2 compound is employed to yield a corresponding 4-alkyl-5-acyl-imidazolone-2 compound.

15. The process of claim 12 in which the 5-acyl-imidazolone-2 compound is acetylated to form a 1,3-diacetyl-5-acyl-imidazolone-2.

ROBERT DUSCHINSKY.